(12) United States Patent
Kondal

(10) Patent No.: US 10,328,336 B1
(45) Date of Patent: Jun. 25, 2019

(54) CONCURRENT GAME FUNCTIONALITY AND VIDEO CONTENT

(71) Applicant: Amazon Technologies, Inc., Seattle, WA (US)

(72) Inventor: Tegdeep Kondal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 422 days.

(21) Appl. No.: 14/657,096

(22) Filed: Mar. 13, 2015

(51) Int. Cl.
*H04N 21/422* (2011.01)
*A63F 9/18* (2006.01)
*H04L 29/06* (2006.01)

(52) U.S. Cl.
CPC .............. *A63F 9/183* (2013.01); *H04L 65/60* (2013.01); *H04L 67/42* (2013.01)

(58) Field of Classification Search
CPC . H04N 21/482; H04N 21/4627; H04N 21/472
See application file for complete search history.

(56) References Cited

U.S. PATENT DOCUMENTS

| | | | |
|---|---|---|---|
| 6,640,284 B1 * | 10/2003 | Shaw | G06F 17/30902 209/215 |
| 6,892,354 B1 * | 5/2005 | Servan-Schreiber | G06Q 30/02 705/14.73 |
| 8,210,916 B2 * | 7/2012 | Ma | A63F 13/10 463/1 |
| 8,790,186 B1 * | 7/2014 | Dethloff | A63F 13/332 463/42 |
| 8,858,313 B1 * | 10/2014 | Selfors | A63F 13/65 463/42 |
| 9,295,914 B2 * | 3/2016 | Almog | A63F 13/12 |
| 2002/0142842 A1 * | 10/2002 | Easley | A63F 13/12 463/42 |
| 2004/0143840 A1 * | 7/2004 | Fukuda | G06Q 30/02 725/32 |
| 2006/0154710 A1 * | 7/2006 | Serafat | A63F 13/10 463/1 |
| 2007/0021058 A1 * | 1/2007 | Arseneau | G06F 1/1626 455/3.06 |
| 2007/0250901 A1 * | 10/2007 | McIntire | H04N 7/17318 725/146 |
| 2008/0045343 A1 * | 2/2008 | Sauberman | G07F 17/32 463/42 |
| 2008/0146342 A1 * | 6/2008 | Harvey | A63F 13/10 463/42 |
| 2008/0229352 A1 * | 9/2008 | Pino | G06Q 30/02 725/22 |
| 2008/0242423 A1 * | 10/2008 | Kerr | G07F 17/32 463/42 |
| 2009/0325706 A1 * | 12/2009 | Geist, Jr. | A63F 13/12 463/40 |

(Continued)

*Primary Examiner* — James S. McClellan
*Assistant Examiner* — Kevin M Carter
(74) *Attorney, Agent, or Firm* — Thomas Horstemeyer, LLP (57) ABSTRACT

Disclosed are various embodiments for a gaming content service implemented by a media distribution service. Game content is encoded for concurrent presentation with video content from a media distribution service. Viewers of the video content may interact with the game content using personal client devices. Whether the game content is presented with the video content may be determined according to a number of participating players.

20 Claims, 7 Drawing Sheets

(56) References Cited

U.S. PATENT DOCUMENTS

| | | | |
|---|---|---|---|
| 2011/0207514 A1* | 8/2011 | Slattery | G07F 17/32 463/9 |
| 2012/0200773 A1* | 8/2012 | Davis | H04N 21/4307 348/515 |
| 2014/0026048 A1* | 1/2014 | Spirer | G06F 3/0484 715/716 |
| 2014/0082645 A1* | 3/2014 | Stern | H04N 21/26258 725/13 |
| 2014/0195675 A1* | 7/2014 | Silver | H04L 65/1083 709/224 |
| 2014/0223464 A1* | 8/2014 | Moran | H04N 21/4788 725/12 |
| 2015/0094139 A1* | 4/2015 | Kargar | A63F 13/795 463/29 |
| 2015/0306498 A1* | 10/2015 | Tornqvist | H04L 67/10 463/36 |

* cited by examiner

CONCURRENT GAME FUNCTIONALITY AND VIDEO CONTENT

BACKGROUND

Video content may be streamed to devices for display to multiple users. These users may each have access to their own device capable of accessing content via a network. These devices may include, for example, mobile devices, tablets, or other devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Media distribution services may stream media content such as video content to a device for display to multiple viewers. For example, the video content may be streamed to a set-top box, computing device, or other device for rendering on a television or other display. Viewers of the video content on the display may also own or otherwise have access to their own respective personal devices. For example, the viewers may have access to mobile devices, smart phones, wearable devices, tablet computing devices, or other devices. The viewers may be capable of interacting with these devices while consuming the video content rendered on the display.

A media distribution service implementing a gaming content service may deliver video content to a first client device for display. The gaming content service may maintain a game session for viewers of the video content. This may include communicating game content for rendering by the first client device concurrent to the video content. As a non-limiting example, the gaming content service may communicate trivia questions or other content rendered as an overlay on the video content. Viewers of the video content having their own respective client devices may then provide input data to the gaming content service to update the game session. For example, the viewers may indicate via their respective client devices answers to the trivia questions. The gaming content service may then update scores, statistics, or other data of the game session according to the inputs. Client applications may allow clients to withdraw from or rejoin a game session, and invite other users to a game session.

In the following discussion, a general description of the system and its components is provided, followed by a discussion of the operation of the same.

Figure 1A:
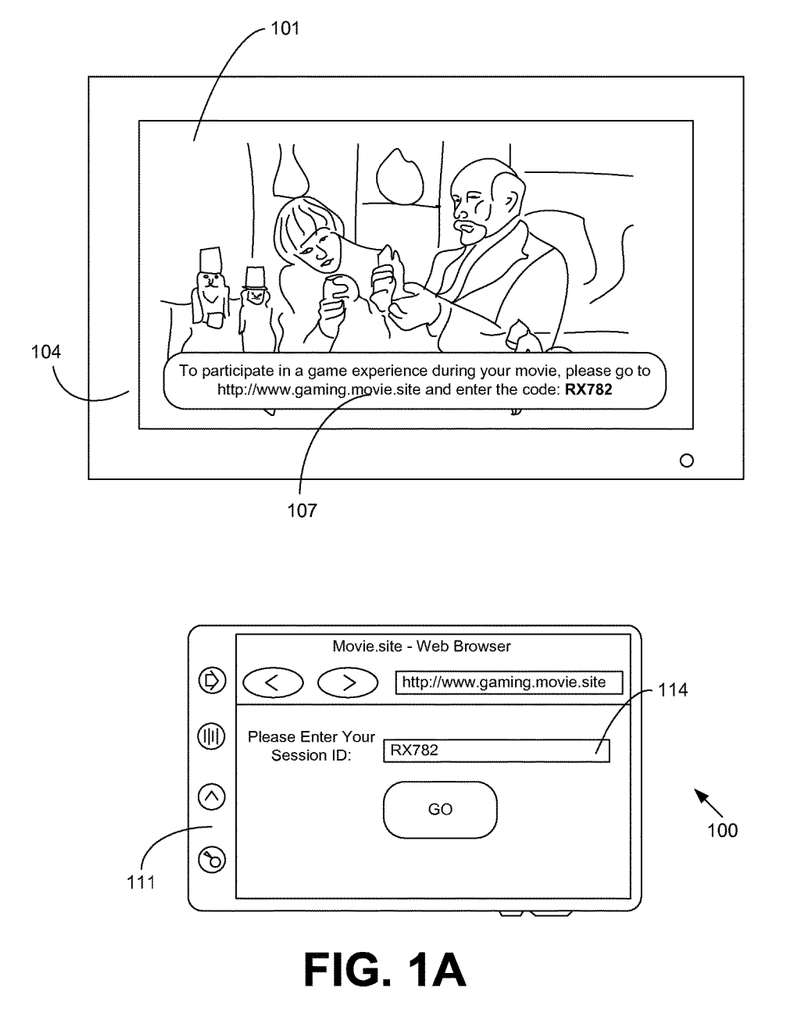
FIGS. 1A and 1B are example scenarios depicting an implementation of various embodiments of the present disclosure.

With reference to FIG. 1A, shown is an example scenario 100 depicting an association of a client device with a game session overlayed onto streaming video content. Item 101 is a display such as a television capable of rendering streaming video content via a network. Item 104 is video content as rendered by the display of item 151. Item 107 is a solicitation for a client device to navigate to a Uniform Resource Locator (URL) and enter in a session identifier "RX782" to associate the client device with a game session to be overlayed onto the video content of item 104.

Item 111 is an exemplary client device accessible by a viewer of the video content rendered on the display of item 101. In this example scenario 100, the client device corresponds to a tablet device browsing a network page obtained from the URL depicted in item 107. Item 114 depicts an input field to enter the session identifier presented in item 107.

Figure 1B:
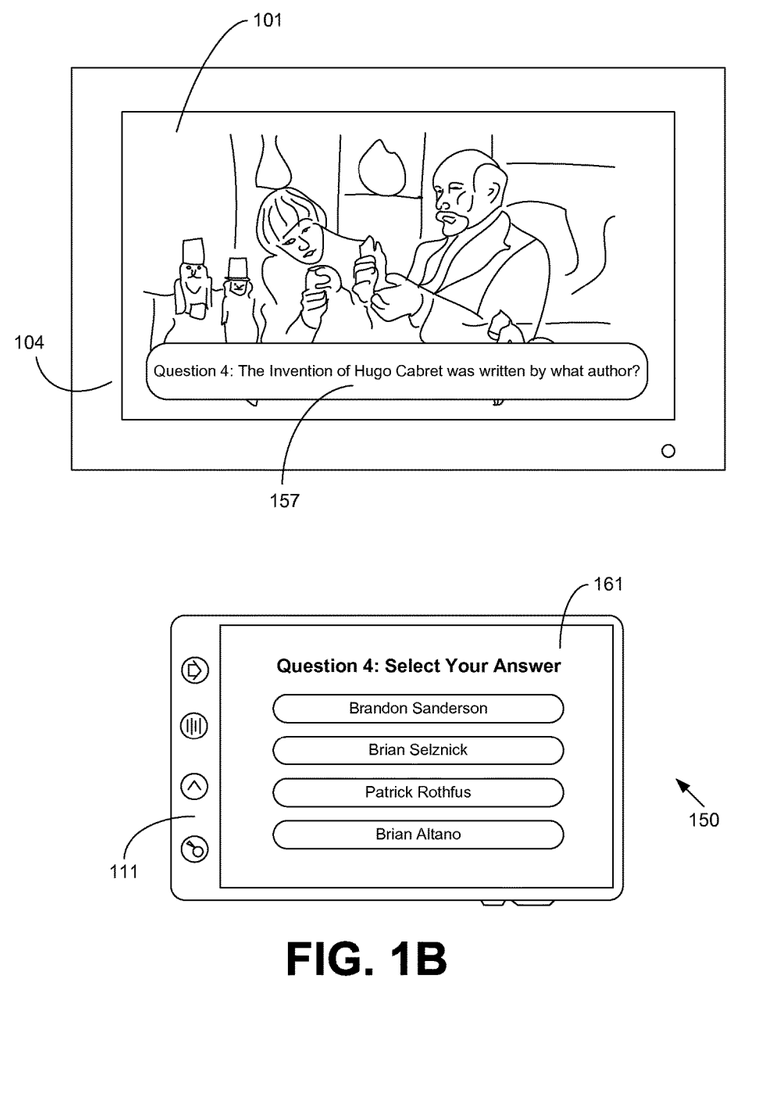

Turning now to FIG. 1B, shown is an example scenario 150 depicting an overlay of a trivia game on streaming video content according to an embodiment of the present disclosure. Item 157 is a trivia question selected by a gaming content service communicated to the display of item 101 for overlay onto the video content of item 154. The game content depicted as item 161 corresponds to a selection of possible answers to the trivia question of item 157. A selection of one of the possible answers initiates a communication of the selected answer to the gaming content service for updating a score or other data relating to the game session.

Figure 2:
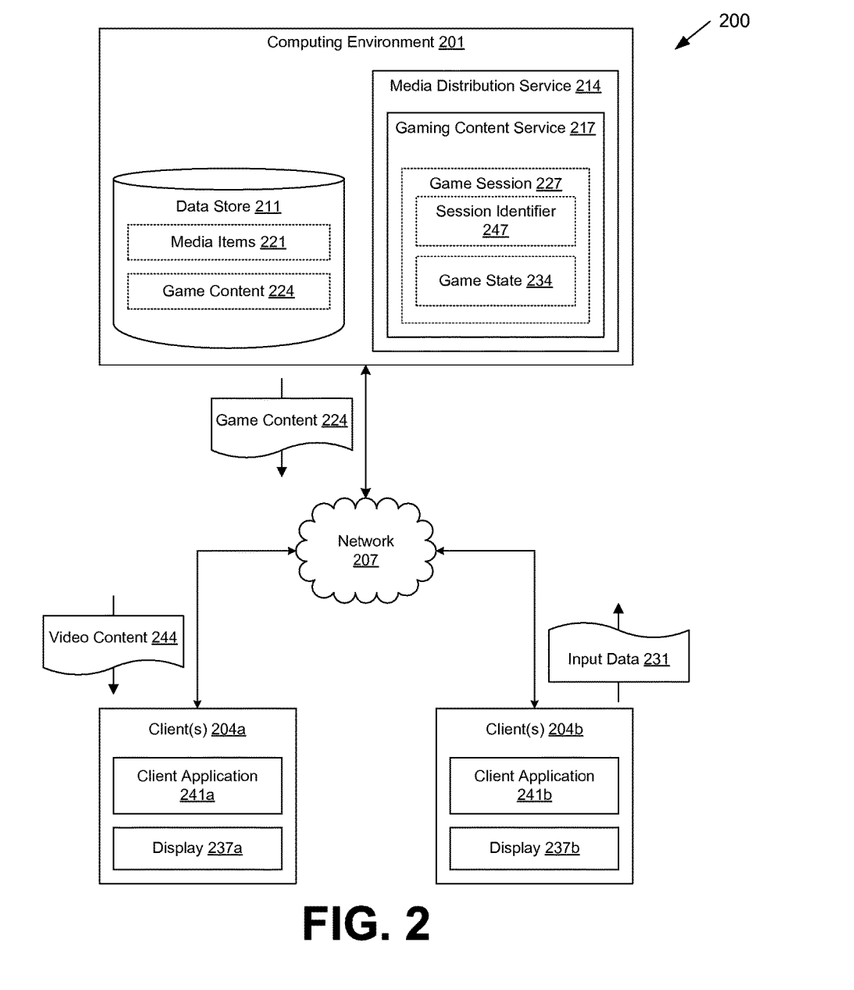
FIG. 2 is a drawing of a networked environment according to various embodiments of the present disclosure.

Moving next to FIG. 2, shown is a networked environment 200 according to various embodiments. The networked environment 200 includes a computing environment 201, clients 204a and 204b, which are in data communication with each other via a network 207. The network 207 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks as can be appreciated.

The computing environment 201 may comprise, for example, a server computer or any other system providing computing capability. Alternatively, the computing environment 201 may employ a plurality of computing devices that may be arranged, for example, in one or more server banks, computer banks, or other arrangements. Such computing devices may be located in a single installation or may be distributed among many different geographical locations. For example, the computing environment 201 may include a plurality of computing devices that together may comprise a hosted computing resource, a grid computing resource and/or any other distributed computing arrangement. In some cases, the computing environment 201 may correspond to an elastic computing resource where the allotted capacity of processing, network, storage, or other computing-related resources may vary over time.

Various applications and/or other functionality may be executed in the computing environment 201 according to various embodiments. Also, various data is stored in a data store 211 that is accessible to the computing environment 201. The data store 211 may be representative of a plurality of data stores 211 as can be appreciated. The data stored in the data store 211, for example, is associated with the operation of the various applications and/or functional entities described in detail below.

The components executed on the computing environment 201, for example, include a media distribution service 214 implementing a gaming content service 217, and other applications, services, processes, systems, engines, or functionality not discussed in detail herein. The media distribution service 214 is executed to facilitate the distribution of media items 221 to clients 204a via the network 207. To this end, the media distribution service 214 may be configured to facilitate the download or streaming of media items 221 by clients 204a. The media distribution service 214 may be further configured to encode, decode, compress, or otherwise transform media items 221 for communication to clients 204a. Additionally, the media distribution service 214 may be configured to process payment instruments such as credit cards, prepaid accounts, or other payment instruments to consummate financial transactions for access to the media distribution service 214 or the distribution of media items 221. Additionally, the media distribution service 214 may be configured to encode data such as network pages for rendering by a client 204a to facilitate interactions by the client 204a with the media distribution service 214. Such network pages may include, for example, user interfaces to facilitate navigating a catalog of media items 221, maintaining selections of media items 221 such as queues, libraries, or other selections, embedded or otherwise encoded media players, or other data. The media distribution service 214 may also serve data encoded for rendering by dedicated applications. The media distribution service 214 may also be configured to perform additional operations with respect to media items 221.

The gaming content service 217 is executed to communicate game content 224 to clients 204a/b. The gaming content service 217 may also maintain a game session 227 associating one or more clients 204b. To this end, the gaming content service 217 may obtain input data 231 from clients 204b corresponding to interactions with a game session 227. The gaming content service 217 may also maintain a game state 234 indicating associated clients 204b, scores, statistics, or other data for a given game session 227.

The data stored in the data store 211 includes, for example, media items 221, game content 224, and potentially other data. Media items 221 include media distributable by the media distribution service 214 via the network 207. Media items 221 may include, for example, audio items, video items, text items, image items, or other media as can be appreciated. Game content 224 includes data or logic facilitating a game session 227 with clients 204b. Game content 224 may include, for example, rules, criteria, or other information defining the structure or progression of a game. Game content 224 may also include graphical components such as video or images, audio components, textual components, or other data as can be appreciated.

The clients 204a/b are representative of a plurality of client devices that may be coupled to the network 207. The clients 204a/b may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, wearable devices, or other devices with like capability. The clients 204a/b may include respective displays 237a and 237b. The displays 237a/b may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The clients 204a/b may be configured to execute various applications such as respective client applications 241a and 241b, and/or other applications. The client applications 241a/b may be executed in a respective client 204a/n, for example, to access network content served up by the computing environment 201 and/or other servers. To this end, the client applications 241a/b may comprise, for example, a browser, a dedicated application, etc. The clients 204a/b may be configured to execute applications beyond the client applications 241a/b such as, for example, email applications, social networking applications, word processors, spreadsheets, and/or other applications.

Next, a general description of the operation of the various components of the networked environment 200 is provided. To begin, the media distribution service 214 initiates a stream of a media item 221 to one or more clients 204a. This may be performed, for example, in response to a request from a client 204a for a particular media item 221, or in response to another event. The media distribution service 214 may stream a media item 221 as video content 244. Video content 244 may include discretized or continuously communicated portions of a media item 221 encoded for rendering as video or audiovideo data by a client 204a. Although the following discussion relates to the streaming of a video media item 221 as video content 244, it is understood that the media item 221 may include other types of media items 221 communicated by other approaches. Additionally, although the following discussion relates to the communication of a media item 221 as a stream, it is understood that the media item 221 may be, for example, fully downloaded or obtained by a client 204a before rendering.

Contemporaneous to the stream of video content 244 by the media distribution service 214, the gaming content service 217 determines whether a game session 227 will be maintained during the stream, thereby allowing clients 204b to play or participate in a game concurrent to the stream of video content 244. Determining whether to maintain a game session 227 during the stream may be performed before video content 244 has started communicating to the client 204a or concurrent to the communication of video content 244. In some embodiments, this may include generating a session identifier 247 corresponding to a game session 227. The session identifier 247 may include a text string, a numerical string, an alphanumeric string, or other unique identifier corresponding to a game session 227.

After generating the session identifier 247, the gaming content service 217 communicates the session identifier 247 to the client 204a for rendering on a display 237a. For example, in some embodiments, the session identifier 247 may be rendered by the display 237a with instructions including a network address, uniform resource locator (URL), or other navigation aid directed to functionality allowing clients 204b to communicate the session identifier 247 to the gaming content service 217. As a non-limiting example, the client 204a may display a URL directed to a web page wherein a user of a client 204b may input the session identifier 247 to associate the client 204b with the game session 227. In other embodiments, the session identifier 247 may be encoded into a graphical representation, such as a Quick Response (QR) code, bar code, or other representation for input to a client 204b by a camera sensor. In further embodiments, the session identifier 247 may be encoded as an audio signal for capture by an input device of a client 204b. Session identifiers 247 may also be encoded by other approaches.

Next, the gaming content service 217 obtains session identifiers 247 from clients 204b to determine which clients 204 are to be associated with the gaming session 227. In some embodiments, this may be performed by obtaining the session identifiers 247 via a network page accessed by clients 204b, as was described above. In other embodiments, the session identifiers 247 may be communicated to the gaming content service 217 via a dedicated client application 244b. The gaming content service 217 may also obtain session identifiers from clients 204b by another approach.

After obtaining the session identifiers 247 from clients 204b, the gaming content service 217 determines whether to maintain a game session 227 during the stream of the media item 221 according to a number of obtained session identifiers 247. For example, in some embodiments, the gaming content service 217 may determine to maintain the game session 227 in response to obtaining session identifiers 247 from a number of clients 204 meeting or exceeding a threshold. In other embodiments, the gaming content service 217 may determine to maintain the game session 227 in response to obtaining a session identifier 247 from one or more predefined clients 204b. Determining whether to maintain the game session 227 may also be performed by another approach.

If the gaming content service 217 determines that a game session 227 will not be maintained during the stream of the media item 221, the gaming content service 217 may terminate an initiated game session 227 or refrain from initiating a game session 227. The media distribution service 214 then continues to communicate the video content 244 to the client 204a without communicating game content 224 to clients 204a/b. If the gaming content service 217 determines that a game session 227 will be maintained during the stream of the media item 221, the gaming content service 217 may perform various actions to initialize, instantiate, reset, or otherwise define a game state 234 for a game session 227. This may include, for example, associating clients 204b from which a session identifier 247 was obtained with a game session 227. This may also include defining or initializing scores, statistics, or other criteria with respect to the associated clients 204b. This may further include initializing a point in a game progression or other logical progression of a game. The gaming content service 217 may also perform other actions to initialize a game state 234.

During the communication of video content 244 for the stream of the media item 221, the gaming content service 217 communicates game content 224 to the client 204a for rendering on the display 237a concurrent to the rendering of the video content 244. This may include, for example, communicating trivia questions, game graphics, or other data rendered as an overlay to the video content 244. In some embodiments, the game content 224 may be communicated to the client 204a in a data stream distinct from the video content 244. The client application 241a may then render the game content 224 as an overlay graphical component with respect to the video content 244. In other embodiments, the game content service 217 may transform, encode, or otherwise modify video content 244 to include the game content 224 before communicating the video content 244 to the client 204a. For example, the game content service 217 may modify, transform, or otherwise alter one or more frames of video data to include portions of the game content 224. The game content 224 may also be communicated to clients 204a by another approach.

In some embodiments, the gaming content service 217 may communicate the game content 224 to the client 204 for rendering when predefined criteria is satisfied. For example, the gaming content service 217 may communicate game content 224 to be rendered or displayed at a predefined interval. As another example, the gaming content service 217 may communicate game content 224 for rendering during a pause of the stream of the media item 221. As a further example, the gaming content service 217 may communicate game content 224 for rendering at a low dialogue or low action point of a media item 221. To this end, the gaming content service 217 may detect points of low dialogue according to an analysis of audio portions of the media item 221 to detect a duration of audio lacking speech meeting or exceeding a threshold. The gaming content service 217 may also detect points of low dialogue according to an analysis of a time coding indicated in a subtitle or closed captioning track. The gaming content service 217 may also perform an action or movement analysis on one or more frames of video content 244 for the media item 221 to detect a low action portion of the media item 221 as can be appreciated.

To this end, the gaming content service 217 may communicate the game content 224 to the client 204a for rendering contemporaneous to the receipt of the game content 224 by the client 204a. In other embodiments, the gaming content service 217 may communicate multiple portions of game content 224 to the client 204a with instructions, time codes, or other criteria for rendering the respective portions of game content 224.

The gaming content service 217 may select the game content 224 to be communicated to the client 204a according to the media item 221 being streamed. For example, the game content 224 may include trivia questions or other content based on a title or work corresponding to the media item 221, personnel associated with the media item 221, or other criteria. In such an embodiment, the trivia questions or content may be obtained from a knowledge base of metadata or supplemental information about the media item 221. The game content 224 may also be selected according to a sponsorship agreement associated with the media item 221. For example, game content 224 could be themed or designed with respect to a particular sponsor. The sponsored game content 224 may be communicated to clients 204a in response to a sponsor paying for placement in the media item 221. The game content 224 may also be selected according to a game state 234 of a game session 227. For example, if scores or statistics indicate that players in the game session 227 are experiencing difficulty or not enough challenge, such as one or more scores falling below or exceeding a threshold, the game content 224 may be selected for a lower or higher difficulty setting. Game content 224 may also be selected by another approach.

The gaming content service 217 may also communicate portions of game content 224 for clients 204b to facilitate an interaction by the clients 204b with the game session 227. The game content 224 communicated to clients 204b may correspond to game content 224 communicated to clients 204a. For example, the game content 224 communicated to the client 204a may include a trivia question. The corresponding game content 224 communicated to the client 204b may include possible answers for the trivia question selectable by a user of the client 204b. In response to an interaction with a user of the client 204b with the game content 224, the client 204b communicates input data 231 indicating the interaction to the gaming content service 217. The input data 231 may include, for example, an indication of a selected answer, an indication of a player action or decision, or other data.

The gaming content service 217 then obtains input data 231 from the clients 204b and updates a game state 234 accordingly. In some embodiments, this may include updating scores associated with respective clients 204b. This may also include recording actions or progressions of actions indicated in the input data 231. The game state 234 may also be updated by another approach.

During the stream of the media item 221 and the game session 227, the gaming content service 217 may disassociate a client 204b with a game session 227, thereby excluding a player corresponding to the disassociated client 204b from a current game. For example, in some embodiments, a timeout may be associated with game content 224, such that corresponding input data 231 should be communicated by a client 204b within the timeout period. If the gaming content service 217 fails to receive input data 231 within the timeout period, the client 204b may be disassociated from the game session 227 as a user of the client 204b may no longer wish to participate. A client 204b may also be disassociated from a game session 227 if the client 204b fails to respond with input data 231 for a number of consecutive or inconsecutive portions of game content 224 meeting or exceeding a threshold. For example, a client 204b may be disassociated with a game session 227 if a user of the client 204b fails to answer a predefined number of consecutive or non-consecutive trivia questions.

In other embodiments, a client 204b may communicate an indication to the gaming content service 217 to withdrawn from a game session 227, thereby disassociating the client 204b from the game session 227. In embodiments in which a client 204b has been disassociated with a game session 227, the client 204b may communicate a request to rejoin a game session 227, thereby reassociating the client 204b with the game session 227. The request may include the session identifier 247 to facilitate associating the client 204b with the game session 227.

In further embodiments, a client 204b may be able to communicate an invitation to another client 204b not associated with a game session 227 to participate in an active game session 227. For example, the client 204b may be able to communicate an Short Message System (SMS) message, email message, push notification, social messaging platform message, social networking message, or other message as can be appreciated as an invitation. The invitation may include, for example, a URL or other navigation aid for accessing the gaming content service 217. The invitation may also include, for example, a session identifier 247, or other data.

The media distribution service 214 and gaming content service 217 may continue to communicate video content 244 to clients 204a and game content to clients 204a/b until the game session 227 ends. In some embodiments, the game session 227 may end upon concluding the stream of the media item 221. This may include the completion of the stream of the media item 221 or a termination of the stream of the media item 221 by a client 204a/b. In other embodiments, the game session 227 may end upon a completion of a game according to rules or criteria of the game. In further embodiments, as clients 204b may be disassociated with a game session 227, the game session 227 may end in response to a number of clients 204b associated with the game session 227 falling below a threshold. The game session 227 may also end by another approach.

When the game session 227 ends, the gaming content service 217 may perform various actions with respect to the ended game session 227. For example, the gaming content service 217 encode for rendering by clients 204a/b scores or other results of the ended game session 227. The gaming content service 217 may also solicit clients 204b to share the results of the game session 227 via a social network, social messaging platform, or another approach.

Although the above discussion recites video content 244 and game content 224 as rendered on a client 204a, it is understood that this video content 244, game content 224, or other content may be rendered on a client 204b in conjunction with or in the alternative to a client 204a. Additionally, although the embodiments above are discussed with respect to a single client 204a rendering video content 244 and game content 224, it is understood that the video content 244 and game content 224 may also be communicated to and rendered by multiple clients 204a. Additionally, it is understood that the operations discussed above may be performed synchronously or asynchronously with respect to multiple clients 204a/b.

Figure 3:
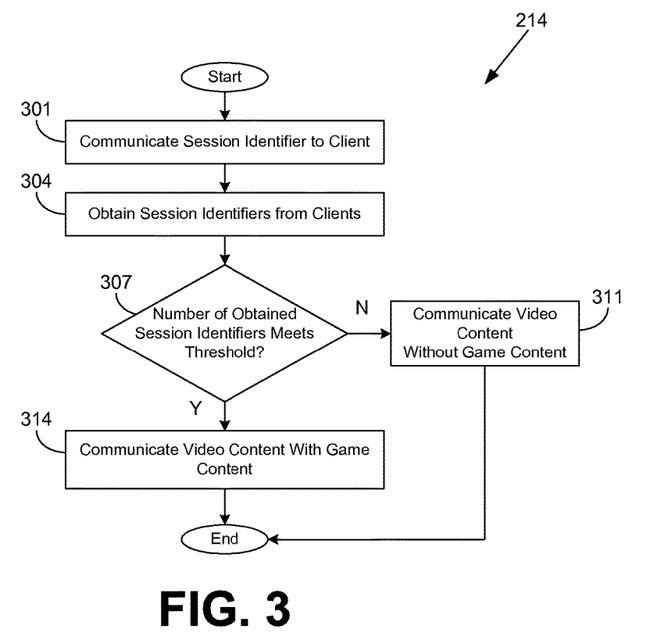
FIGS. 3 and 4 are flowcharts illustrating examples of functionality implemented as portions of a media distribution service executed in a computing environment in the networked environment of FIG. 2 according to various embodiments of the present disclosure.

Referring next to FIG. 3, shown is a flowchart that provides one example of the operation of a portion of the media distribution service 214 implementing a gaming content service 217 (FIG. 2) according to various embodiments. It is understood that the flowchart of FIG. 3 provides merely an example of the many different types of functional arrangements that may be employed to implement the operation of the portion of the media distribution service 214 as described herein. As an alternative, the flowchart of FIG. 3 may be viewed as depicting an example of elements of a method implemented in the computing environment 201 (FIG. 2) according to one or more embodiments.

Beginning with box 301, the gaming content service 217 communicates a session identifier 247 (FIG. 2) to a client 204a (FIG. 2) for rendering by a display 237a (FIG. 2). The session identifier 247 may correspond to a game session 227 (FIG. 2) to be initialized or an already generated or initialized game session 227. Next, in box 304, the gaming content service 217 obtains session identifiers 247 from clients 204b. This may include obtaining the session identifiers 247 via a network page or other content communicated to the client 204b, via an Application Programming Interface (API) or web service call accessible to a dedicated client application 241b (FIG. 2), or by another approach.

After obtaining the session identifiers 247, the gaming content service 217 determines whether a number of obtained session identifiers 247 meets a predefined threshold in box 307. If not, the process advances to box 311, where the media distribution service 214 communicates video content 244 (FIG. 2) to clients 204a without the gaming content service 217 maintaining a game session 227. In other words, the media distribution service 214 streams a media item 221 without additional game content 224 being communicated to clients 204a/b. After this, the process ends.

If, in box 307, the number of obtained session identifiers 247 meets the predefined threshold, the process advances to box 314 where the gaming content service 217 communicates the video content 244 to the client 204a and the game content 224 to clients 204a/b, after which the process ends.

Figure 4:
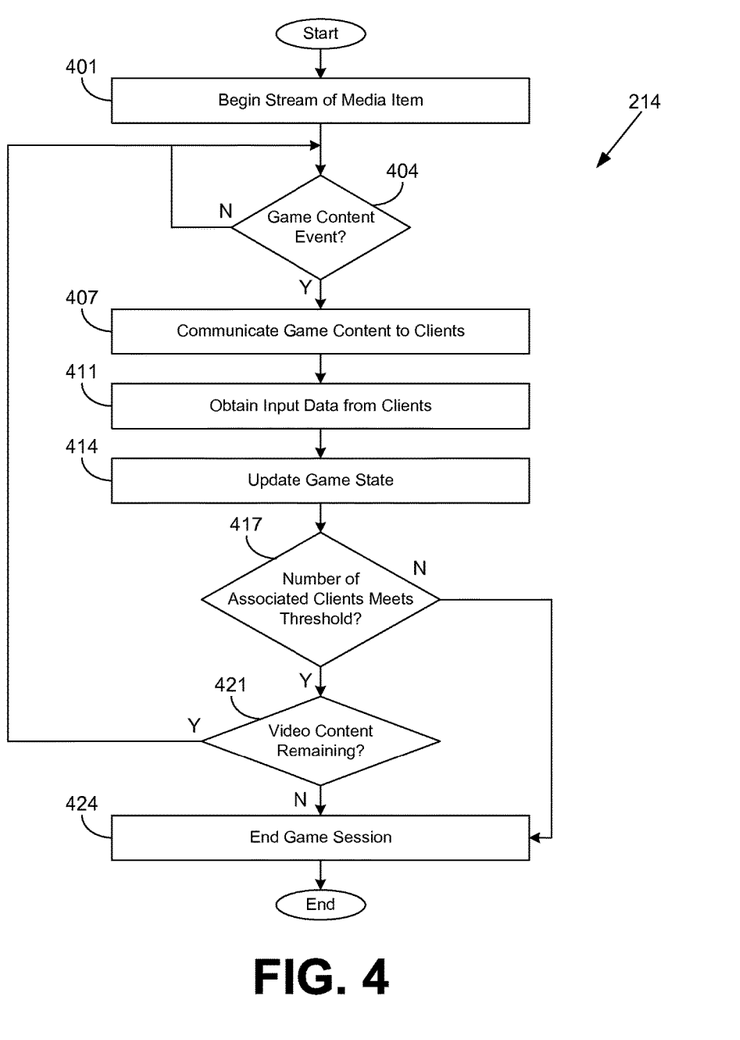

Moving on to FIG. 4, shown is a flowchart that provides one example of the operation of a portion of the media distribution service 214 implementing a gaming content service 217 (FIG. 2) according to various embodiments. It is understood that the flowchart of FIG. 4 provides merely an example of the many different types of functional arrangements that may be employed to implement the operation of the portion of the media distribution service 214 as described herein. As an alternative, the flowchart of FIG. 4 may be viewed as depicting an example of elements of a method implemented in the computing environment 201 (FIG. 2) according to one or more embodiments.

Beginning with box 401, the media distribution service 214 begins the stream of a media item 221 (FIG. 2) to a client 204a (FIG. 2). During the stream of the media item 221, in box 404, the gaming content service 217 determines if an event has occurred triggering the communication of game content 224 (FIG. 2) to clients 204a/b. For example, this may include determining whether the stream of the media item 221 has reached a predefined time code where game content 224 should be communicated. As another example this may include determining if the media item 221 is at a point of low dialogue or low action. This may also include determining if a predefined time interval has passed since the last communication of game content 224. Determining whether an event has occurred that triggers the communication of game content 224 may also be performed by other approaches as can be appreciated.

If no event triggering the communication of game content 224 has occurred, the process remains at box 404 until an event occurs. The process then advances to box 407 where the gaming content service 217 communicates game content 224 to clients 204a/b (FIG. 2). This may include, for example, communicating the gaming content 224 to clients 204a in a separate data stream for demultiplexing by a client application 241a (FIG. 2) to render the gaming content 224 as an overlay to video content 244 (FIG. 2). This may also include transforming or modifying video content 244 to further include game content 224 prior to communication to clients 204a. Communicating game content 224 to clients 204a/b may also be performed by another approach.

Next, in box 411, the gaming content service 217 obtains input data 231 (FIG. 2) from clients 204b. The gaming content service 217 may obtain input data 231 for corresponding game content 224 during a predefined timeout period, until additional came content 224 is communicated to clients 204a/b, or until other criteria is satisfied. After obtaining the input data 231, in box 414, the gaming content service 217 updates a game state 234 (FIG. 2) according to the input data 231. This may include, for example, updating scores, statistics, milestones, game progression, or other attributes of a game to reflect the input data 231. In some embodiments, updating the game state 234 may include disassociating clients 204b that did not communicate input data 231 within a timeout period defined with respect to the rendering of the game content 224. The game state 234 may also be updated by another approach.

Next, in box 417, the gaming content service 217 determines if a number of clients 204b associated with the game session 227 meets a predefined threshold. If not, the process advances to box 424, where the game session 227 ends, after which the process ends. Otherwise, if the number of associated clients 204b meets or exceeds the threshold, the process advances to box 421 where the gaming content service 217 determines if there is additional video content 244 to be communicated during the stream of the media item 221. If not, indicating that the stream has concluded, the process advances to box 424, where the game session 227 ends, after which the process ends. Otherwise, the process returns to box 404 where the gaming content service 217 waits to another event indicating that game content 224 should be communicated to the clients 204a/b.

Figure 5:
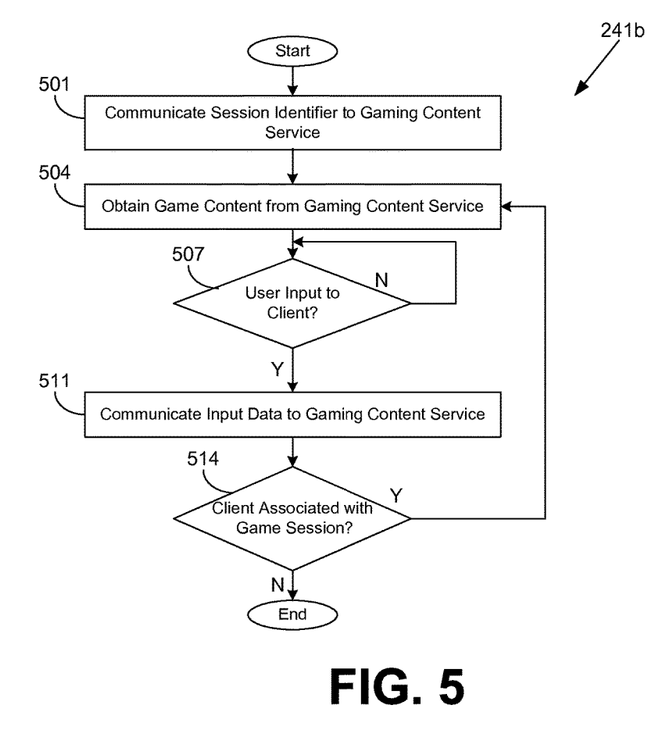
FIG. 5 is a flowchart illustrating one example of functionality implemented as portions of a client application in a client in the networked environment of FIG. 2 according to various embodiments of the present disclosure.

Turning now to FIG. 5, shown is a flowchart that provides one example of the operation of a portion of a client application 241b executed by a client 204b (FIG. 2) accessing a gaming content service 217 (FIG. 2) according to various embodiments. It is understood that the flowchart of FIG. 5 provides merely an example of the many different types of functional arrangements that may be employed to implement the operation of the portion of the client application 241b as described herein. As an alternative, the flowchart of FIG. 5 may be viewed as depicting an example of elements of a method implemented in the computing environment 201 (FIG. 2) according to one or more embodiments.

Beginning with box 501, the client application 241b communicates a session identifier 247 (FIG. 2) to the gaming content service 217 to associate the client 204b with a game session 227 (FIG. 2). Next, in box 504, the client application 241b obtains game content 224 from the gaming content service 217. This may further include rendering the game content 224 on a display 237b (FIG. 2). In box 507 the client application 241b waits until a user input to the client 204b is received. For example, the user input may correspond to a selection of an answer to a trivia question from possible answers encoded in the game content 224. The user input may also correspond to another indication of a player action, or another input.

Next, in box 511, the client application 241b communicates input data 231 (FIG. 2) to the gaming content service 217 reflecting the user input to the client 204b. For example, this may include encoding a selected answer or action to be performed with respect to a game session 227. After communicating the input data 231 to the gaming content service, the client application 241b determines if the client 204b is still associated with a game session 227. This may include, for example, determining if the gaming content service 217 has disassociated the client 204b with the game session 227 due to the expiration of a timeout, an ejection by an administrator or other user, or another criteria. This may also include determining if the game session 227 has ended due to the completion of a game, or the termination or completion of a stream of a media item 221. This may also include determining if another criterion is satisfied.

If the client 204b is still associated with a game session 227, the process returns to box 504, where the client application 241b obtains additional game content 224. Otherwise, the process ends.

Figure 6:
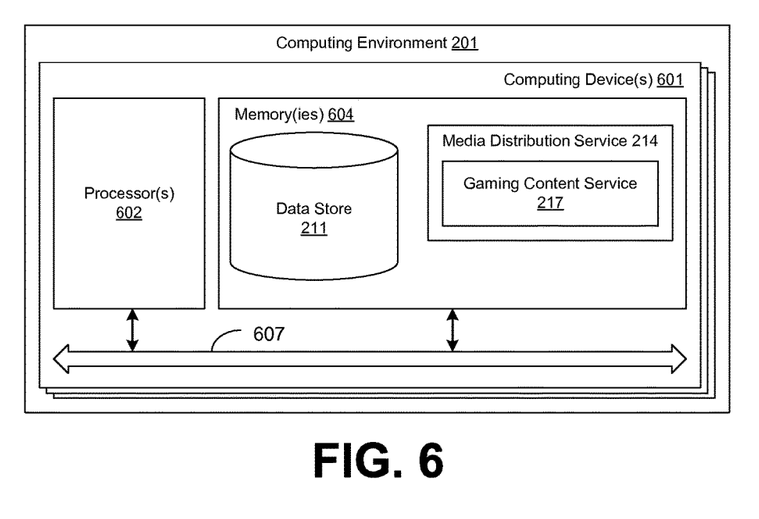
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 201 according to an embodiment of the present disclosure. The computing environment 201 includes one or more computing devices 601. Each computing device 601 includes at least one processor circuit, for example, having a processor 602 and a memory 604, both of which are coupled to a local interface 607. To this end, each computing device 601 may comprise, for example, at least one server computer or like device. The local interface 607 may comprise, for example, a data bus with an accompanying address/control bus or other bus structure as can be appreciated.

Stored in the memory 604 are both data and several components that are executable by the processor 602. In particular, stored in the memory 604 and executable by the processor 602 are a media distribution service 214 implementing a gaming content service 217, and potentially other applications. Also stored in the memory 604 may be a data store 211 and other data. In addition, an operating system may be stored in the memory 604 and executable by the processor 602.

It is understood that there may be other applications that are stored in the memory 604 and are executable by the processor 602 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 604 and are executable by the processor 602. In this respect, the term "executable" means a program file that is in a form that can ultimately be run by the processor 602. Examples of executable programs may be, for example, a compiled program that can be translated into machine code in a format that can be loaded into a random access portion of the memory 604 and run by the processor 602, source code that may be expressed in proper format such as object code that is capable of being loaded into a random access portion of the memory 604 and executed by the processor 602, or source code that may be interpreted by another executable program to generate instructions in a random access portion of the memory 604 to be executed by the processor 602, etc. An executable program may be stored in any portion or component of the memory 604 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 604 is defined herein as including both volatile and nonvolatile memory and data storage components. Volatile components are those that do not retain data values upon loss of power. Nonvolatile components are those that retain data upon a loss of power. Thus, the memory 604 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 602 may represent multiple processors 602 and/or multiple processor cores and the memory 604 may represent multiple memories 604 that operate in parallel processing circuits, respectively. In such a case, the local interface 607 may be an appropriate network that facilitates communication between any two of the multiple processors 602, between any processor 602 and any of the memories 604, or between any two of the memories 604, etc. The local interface 607 may comprise additional systems designed to coordinate this communication, including, for example, performing load balancing. The processor 602 may be of electrical or of some other available construction.

Although the media distribution service 214 implementing a gaming content service 217, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3, 4 and 5 show the functionality and operation of an implementation of portions of the media distribution service 214 implementing a gaming content service 217, or client application 241b (FIG. 2). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 602 in a computer system or other system. The machine code may be converted from the source code, etc. If embodied in hardware, each block may represent a circuit or a number of interconnected circuits to implement the specified logical function(s).

Although the flowcharts of FIGS. 3, 4 and 5 show a specific order of execution, it is understood that the order of execution may differ from that which is depicted. For example, the order of execution of two or more blocks may be scrambled relative to the order shown. Also, two or more blocks shown in succession in FIGS. 3, 4 and 5 may be executed concurrently or with partial concurrence. Further, in some embodiments, one or more of the blocks shown in FIGS. 3, 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the media distribution service 214 implementing the gaming content service 217, that comprises software or code can be embodied in any non-transitory computer-readable medium for use by or in connection with an instruction execution system such as, for example, a processor 602 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the media distribution service 214 implementing the gaming content service 217, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 601, or in multiple computing devices in the same computing environment 201. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program that, when executed in at least one computing device, causes the at least one computing device to at least:
    communicate, to at least one first client device, a video stream for display on the at least one first client device;
    communicate, to the at least one first client device, an identifier corresponding to a game session for overlay over a display of the video stream on the at least one first client device;
    obtain, from at least one of a plurality of second client devices, the identifier a number of times; and
    in response to the number of times meeting a threshold:
        modify the video stream to further comprise at least a portion of game content at a point in time of the video stream that is below a dialogue threshold or a movement threshold, the game content being associated with the game session;
        communicate the video stream and at least the portion of the game content to the at least one first client device, the video stream being encoded for concurrent rendering and display with at least the portion of the game content by the at least one first client device;
        update the game session according to at least one input obtained from at least one of the plurality of second client devices; and
        terminate the game session in response to at least one of a conclusion of the video stream or a number of the plurality of second client devices participating in the game session falling below the threshold.

2. The non-transitory computer-readable medium of claim 1, wherein the program further causes the at least one computing device to at least remove at least one second client device among the plurality of second client devices participating in the game session from the game session in response to at least one of a timeout or an indication from the at least one second client device.

3. The non-transitory computer-readable medium of claim 1, wherein the portion of the game content comprises a plurality of trivia questions associated with a media title corresponding to the video stream.

4. A system, comprising:
    a data store; and
    at least one computing device communicably coupled with the data store, the at least one computing device being configured to at least:
        communicate, to at least one first client device, a stream of video content corresponding to a media title available through a media distribution service for display on the at least one first client device;
        modify the stream of video content to further comprise game content at a point in time of the video content that is below a dialogue threshold or a movement threshold based at least in part on receipt of an identifier associated with a game session from at least one second client device, the game content being associated with the game session;
        communicate, to the at least one first client device, the video content with the game content encoded for rendering and display by the at least one first client device;
        obtain, from the at least one second client device, at least one input corresponding to the game content; and
        update the game session associated with the game content according to the at least one input.

5. The system of claim 4, wherein the at least one computing device is further configured to at least:
    communicate, to the at least one first client device, the identifier associated with the game session for overlay over a display of the stream of video content; and
    associate the at least one second client device with the game session in response to the receipt of the identifier from the at least one second client device.

6. The system of claim 4, wherein the at least one computing device is further configured to at least:
    obtain the identifier associated with the game session a number of times from the at least one second client device; and
    in response to the number of times falling below a threshold, terminate the game session.

7. The system of claim 4, wherein the at least one computing device is further configured to at least terminate the game session in response to a number of the at least one second client device falling below a threshold.

8. The system of claim 4, wherein the at least one input comprises a withdrawal from the game session by the at least one second client device, and the at least one computing device is further configured to at least disassociate the at least one second client device with the game session.

9. The system of claim 4, wherein the game content comprises at least a portion of trivia content associated with the video content.

10. The system of claim 4, wherein the at least one computing device is further configured to at least:
    detect at least one of a low action portion of the video content, a low dialogue portion of the video content, or a pause of the video content; and
    instruct the at least one first client device to render a portion of the game content during at least one of the low action portion of the video content, the low dialogue portion of the video content, or the pause of the video content.

11. The system of claim 4, wherein the at least one computing device is further configured to at least instruct the at least one first client device to render a portion of the game content at a predefined time code associated with the video content.

12. A method, comprising:
    communicating, by at least one computing device, video stream content to at least one first client device for display on the at least one first client device;
    communicating, by the at least one computing device, an identifier corresponding to a game session to the at least one first client device for overlay over a display of the video stream on the at least one first client device;
    associating, by the at least one computing device, a plurality of second client devices with the game session in response to obtaining the identifier from the plurality of second client devices;
    determining, by the at least one computing device, a number of times the identifier has been obtained from the plurality of second client devices;
    modifying, by the at least one computing device, the video stream to include game content at a point in time of the video stream that is below a dialogue threshold or a movement threshold, wherein the video stream is modified to include game content at the point in time in response to the number of times meeting a threshold;
    communicating, by the at least one computing device, the video stream content to the at least one first client device, the video stream content including game content associated with the game session, the game content being encoded for concurrent rendering and display by the at least one first client device; and
    updating, by the at least one computing device, the game session according to at least one input obtained from at least one of the plurality of second client devices.

13. The method of claim 12, further comprising communicating, by the at least one computing device, the video stream content without the game content in response to the number of times the identifier has been obtained from the plurality of second client devices fails to meet the threshold.

14. The method of claim 12, further comprising disassociating, by the at least one computing device, one of the plurality of second client devices from the game session in response to at least one of an indication from the one of the plurality of second client devices to disassociate from the game session or a timeout associated with the one of the plurality of second client devices.

15. The method of claim 14, further comprising associating, by the at least one computing device, the one of the plurality of second client devices with the game session in response to a request to rejoin the game session.

16. The method of claim 12, further comprising associating, by the at least one computing device, another second client device with the game session in response to a request to join the game session, the request comprising the identifier included in an invitation from one of the plurality of second client devices to the other second client device.

17. The method of claim 12, wherein the game content comprises a plurality of trivia questions, and the method further comprises selecting, by the at least one computing device, at least a portion of the plurality of trivia questions from a knowledge base according to a media title associated with the video stream content.

18. The method of claim 12, wherein the game content comprises a plurality of trivia questions, and the method further comprises selecting, by the at least one computing device, at least a portion of the plurality of trivia questions according to a sponsorship agreement.

19. The system of claim 8, wherein the at least one computing device is further configured to at least:
    receive a request to rejoin the game session from the at least one second client device; and
    reassociate the at least one second client device with the game session.

20. The system of claim 4, wherein the game content is overlaid onto the stream of the video content.

* * * * *